United States Patent Office 3,280,093
Patented Oct. 18, 1966

3,280,093
METHOD FOR PRODUCING A REDUCED
TRANSITION METAL HALIDE
Harry W. Coover, Jr., Kingsport, Tenn., and Newton H. Shearer, Jr., Zurich, Switzerland, assignors to Eastman Kodak Company, Rochester, N.Y., a corporation of New Jersey
No Drawing. Filed July 11, 1963, Ser. No. 294,269
14 Claims. (Cl. 260—93.7)

This invention relates to a novel process for the production of reduced transition metal halides and to the product thus produced. In a specific aspect this invention relates to an improved process for the polymerization of olefins to solid, crystalline polymers with a catalyst containing novel reduced transition metal halides. In another specific aspect this invention relates to the polymerization of propylene and higher molecular weight olefinic hydrocarbons in the presence of a catalyst containing an improved reduced transition metal halide.

Solid, high molecular weight, crystalline polymers have been formed from propylene and higher molecular weight olefins using catalyst systems containing a reduced transition metal halide as one of the catalyst components. The reduced transition metal halide is an essential component of the catalyst and various methods have been employed to produce the reduced transition metal halides. One of the methods has involved the reduction of the transition metal halide from its maximum valence with hydrogen. The resulting product is a reduced transition metal halide, but when this halide is employed in the polymerization of propylene and similar olefins to solid, crystalline polymer, the reaction rates are rather low and uneconomical, and the polymeric product contains substantial amounts of atactic or amorphous polymer. Attempts to improve the polymerization rate in order to achieve an economical process have resulted primarily in increased production of the atactic or amorphous polymer without achieving the desired increase in the production of highly crystalline polymer.

Another method for producing reduced transition metal halides involves the reduction of a transition metal halide from its maximum valence with aluminum or other similar reducing metal. In this reaction the halide of the reducing metal is one of the products, and the difficulties encountered in this process can be illustrated using aluminum as the reducing metal and titanium tetrachloride as the transition metal halide to be reduced. In the reaction of aluminum with titanium tetrachloride aluminum trichloride and titanium trichloride are products of the reaction. The desired product is titanium trichloride but in order for the titanium trichloride to be useful in producing highly crystalline polymers it is essential that the aluminum trichloride be removed from the titanium trichloride. The problem of removing the aluminum trichloride is quite difficult and attempts to remove the aluminum trichloride by such procedures as extraction or sublimation have been only partially successful. It appears that the separation problem may be related to the fact that aluminum trichloride and titanium trichloride are isomorphous, and, consequently, they crystallize quite readily together in the same crystalline lattice. Thus, titanium trichloride prepared by an aluminum reduction reaction has been found to contain substantial amounts of aluminum trichloride and when the titanium trichloride is employed in olefin polymerization reactions the presence of the aluminum trichloride results in the formation of prohibitively large quantities of oily and amorphous polymers.

It is an object of this invention to provide a novel process for the production of reduced transition metal halides, such as titanium trichloride. It is another object of this invention to produce reduced transition metal halides having catalytic properties not attainable with prior art types of reduced transition metal halides. It is a further object of this invention to effect olefin polymerization reactions in the presence of catalysts containing our novel reduced transition metal halide to produce highly crystalline, solid polymers and to substantially reduce the formation of oily and amorphous polymers in the polymerization reaction. Further and additional objects of this invention will be apparent from the detailed disclosure that follows.

In accordance with our invention, we have found that an improved form of a reduced transition metal halide can be obtained by reducing a halide of a transition metal selected from the group consisting of titanium, zirconium, vanadium, molybdenum and chromium with a reducing metal selected from Group I of the Periodic Table in the presence of a complexing agent that forms a complex with the halide of said reducing metal produced in the process, the complex of the halide of said reducing metal being substantially soluble in said complexing agent. The resulting product containing the reduced transition metal halide can be employed as it is formed by the reduction reaction and the Group I metal halide in the product does not deleteriously affect the polymerization reaction. On the other hand, the Group I metal halide is readily separable from the transition metal halide in the reduction reaction product, and, as a result of our novel reduction reaction, it is possible to produce a reduced transition metal halide substantially free of free reducing metal halide.

The reducing metals that can be used in practicing our invention are selected from Group I of the Periodic Table. Among these reducing metals are sodium, lithium, potassium, rubidium and cesium. It is preferred to employ an alkali metal selected from the group consisting of sodium, potassium and lithium or an alloy of metals containing said alkali metal.

In the transition metal halides that are employed in our process the transition metal is selected from the group consisting of titanium, zirconium, vanadium, molybdenum and chromium and the halogen atoms are selected from the group consisting of chlorine, bromine and iodine. Prior to reduction, the transition metal is at its maximum valence and during the reduction a lower valency form of the transition metal is produced. We prefer to employ titanium tetrachloride in our process, and, as a result of the reduction reaction, titanium trichloride is formed.

The complexing agent that is used in our process forms a complex with the reducing metal halide produced in the reduction reaction. The resulting complex is soluble in the complexing agent, and in most instances the complex is also soluble in common organic solvents, such as toluene, xylene, benzene, and the like. As complexing agent or medium for carrying out the transition metal halide reduction reaction we prefer to employ a diaryl ether. Among the diaryl ethers that can be used are diphenyl ether, ditolyl ether, dixylyl ether, phenyltolyl ether, di(biphenyl)ether, diphenylphenyl ether, di(ethylphenyl)-ether, di(propylphenyl)ether, di(n-butylphenyl)ether and the like. We prefer to employ diphenyl ether in our process, and, if desired, the diphenyl ether can be used in admixture with biphenyl which is commonly known as Dowtherm.

Other complexing agents that can be used are amides, such as N,N-dimethylformamide, acetamide, N,N-dimethylacetamide, propionamide and the like. Ketones, such as benzophenone, acetophenone, butyrone and 3-pentanone are similarly useful in our process. Carboxylic esters, such as ethyl benzoate, ethyl malonate, butyl succinate, propyl adipate, ethyl sebacate, butyl naphthoate, and the like are useful as complexing agents, and similarly phenols such as p-cresol, o-ethyl phenol, m-propyl phenol and other similar alkyl phenols are useful in our process. Nitro-containing compounds and nitrile-containing compounds such as nitrobenzene, p-nitrotoluene, 2-nitro-p-cymene, benzonitrile, butyronitrile, capronitrile, 2-naphtho-nitrile and the like can also be employed. The organic sulfur compounds, such a dimethyl sulfoxide, dimethyl sulfone, diethyl sulfate, N,N-dimethylbenzene sulfonamide, dimethyl sulfoximine, dibutyl sulfoxide, dioctyl sulfone, diphenyl sulfate, N,N-dipropyl benzene sulfonamide, diethyl sulfoxide, and the like, are also useful in our process. We have also found that organophosphorus compounds, such as hexaalkyl phosphoramides, trialkyl and triaryl phosphates and trialkyl and triaryl phosphites are useful as reaction media or complexing agents. For example, hexamethyl phosphoric triamide, triphenyl phosphate, tricresyl phosphate, tridecyl phosphite, triethyl phosphite, triphenyl phosphite, triethyl phosphate, hexabutyl phosphoric triamide, hexaoctyl phosphoric triamide and the like can be similarly employed. In the organophosphorus compounds, the alkyl radicals usually contain 1 to 8 carbon atoms.

The details of the reduction reaction will be described using an alkali metal as the reducing metal, titanium tetrachloride as the transition metal to be reduced and diphenyl ether as the complexing agent or reaction medium. However, it will be understood that any of the reducing metals, transition metal halides and complexing agents set forth above can be similarly employed in the practice of our invention. The titanium tetrachloride is reduced to titanium trichloride with the alkali metal in diphenyl ether at a temperature usually within the range of −80 to 270° C., preferably −40 to 250° C. In the reaction from 0.5 to 5.0, preferably 0.9 to 1.5, times the stoichiometric quantity of alkali metal required to reduce the titanium tetrachloride to titanium trichloride is used. When the reduction reaction is conducted in the presence of diphenyl ether, alkali metal chloride formed during the reaction and diphenyl ether form a complex. As a result of the formation of this complex, co-crystallization of the alkali metal chloride and the titanium trichloride is prevented and the removal of alkali metal chloride from the reaction mixture is facilitated. The alkali metal chloride can be removed by filtering the hot reaction mixture, usually at the temperature used for the reduction reaction, since the alkali metal chloride-diphenyl ether complex is soluble in the diphenyl ether at reduction reaction temperatures. After filtration, the solid titanium trichloride can be washed with fresh hot diphenyl ether, and subsequently, with toluene or other organic solvent. The resulting titanium trichloride is a highly active catalyst component for olefin polymerization catalyst systems and it contains less than a one percent by weight of alkali metal chloride. It is not essential that the alkali metal chloride-diphenyl ether complex be separated from the titanium trichloride in order that the titanium trichloride will be effective as a catalyst component. Thus, the hot reduction reaction mixture can be cooled prior to filtering and in that event the titanium trichloride is admixed with alkali metal chloride-diphenyl ether complex. The titanium trichloride actually contains substantially no free or uncomplexed alkali metal chloride and the titanium trichloride prepared in this manner can be used effectively as a catalyst component in olefin polymerization reactions.

We do not know the reason for the improved catalytic activity of a reduced transition metal halide, for example titanium trichloride prepared by practicing our invention. X-ray diffraction and infrared studies of titanium trichloride or other reduced transition metal halide produced according to our invention do not show any characterizing difference when compared with a similar reducing transition metal halide produced by using a reducing metal without any of our co-reducing agents. The most important characterizing difference of our reduced transition metal halides appears to be their unexpected superior activity when used as a component in catalyst systems that are used to polymerize olefinic hydrocarbons to solid, crystalline polymer.

If desired, in the titanium tetrachloride reduction reaction from 1 to about 30 mole percent of the titanium tetrachloride can be replaced by another transition metal halide, such as vanadium tetrachloride, zirconium tetrachloride, molybdenum pentachloride, chromic chloride and the like. The resulting mixture of transition metal halides can be reduced with reducing metal in the manner described above and the resulting mixture of reduced transition metal halides can be similarly employed in olefin polymerization reactions. The titanium trichloride in our process has been found to contain no titanium dichloride. Thus, in the reduction reaction, the titanium tetrachloride is converted or reduced to the titanium trichloride without the formation of any titanium dichloride.

The reduced transition metal halide, such as titanium trichloride that is produced in our process can be employed in olefin polymerization catalyst systems which have been employed heretofore for the preparation of solid, high molecular weight, crystalline polymers. Thus, the reduced transition metal halide can be employed with at least one catalyst component selected from the following: (a) a metal from Groups Ia, II and IIIa of the Periodic Table, alkyl and hydride derivatives of the metals in Groups Ia, II and IIIa of the Periodic Table and complex metal hydrides of aluminum and alkali metal; (b) organoaluminum halides having the formula $R_mAlX_n$ and $R_3Al_2X_3$ wherein R is a hydrocarbon radical selected from the group consisting of lower alkyl, cycloalkyl, phenyl and tolyl, X is a halogen selected from the group consisting of chlorine and bromine and $m$ and $n$ are integers whose sum is equivalent to the valence of aluminum and (c) a polymeric reaction product of aluminum and a methylene halide. The polymerization reaction can be carried out in liquid phase in an inert organic liquid and preferably an inert liquid hydrocarbon vehicle, but excellent results can be obtained without using a solvent. The reaction proceeds with excellent results over a temperature range of from 0° C. to 250° C., but temperatures outside this range can be used if desired. Likewise, the reaction pressures may be varied widely from about atmospheric pressure to very high pressures of the order of 20,000 p.s.i. or higher. The liquid vehicle employed is desirably one which serves as an inert liquid reaction medium.

The polymerization reaction is employed in the preparation of highly crystalline polypropylene, the polybutenes and polystyrene although it can be used for polymerization mixtures of ethylene and propylene as well as other α-monoolefins containing up to 10 carbon atoms. The polypropylene produced in accordance with this invention is a highly crystalline polymer that can be used in molding operations to form products of excellent clarity. The high molecular weight, high density polymers of this invention are insoluble in solvents at ordinary temperatures, but they are soluble in such solvents as xylene, toluene, or tetralin at elevated temperatures. These solubility characteristics make it possible to carry out the polymerization process under conditions wherein the polymer formed is soluble in the reaction medium during the polymerization and can be precipitated therefrom by lowering the temperature of the resulting mixture.

The polypropylene, polystyrene, polybutenes and other polyolefins prepared in accordance with the invention can be molded or extruded and can be used to form plates, sheets, films or a variety of molded objects which exhibit a higher degree of stiffness than do the corresponding high pressure polyolefins. The products can be extruded in the form of pipe or tubing of excellent rigidity and can be injection molded into a great variety of articles. The polymers can also be cold drawn into ribbons, bands, fibers or filaments of high elasticity and rigidity. Fibers of high strength can be spun from the molten polymers obtained according to this process.

The polymerization reaction can be carried out batchwise or in a continuous flowing stream process. The continuous processes are preferred for economic reasons, and particularly good results are obtained using continuous processes wherein a polymerization mixture of constant composition is continuously and progressively introduced into the polymerization zone and the mixture resulting from the polymerization is continuously and progressively withdrawn from the polymerization zone at an equivalent rate, whereby the relative concentration of the various components in the polymerization zone remains substantially unchanged during the process. This results in formation of polymers of extremely uniform molecular weight distribution over a relatively narrow range. Such uniform polymers possess distinct advantages since they do not contain any substantial amount of the low molecular weight or high molecular weight formations which are ordinarily found in polymers prepared by batch reactions.

In the continuous flowing stream process, the temperature is desirably maintained at a substantially constant value within the preferred range in order to achieve the highest degree of uniformity. Since it is desirable to employ a solution of the monomer of relatively high concentration, the process is desirably effected under a pressure of from 30 to 1000 p.s.i. obtained by pressuring the system with the monomer being polymerized. The amount of vehicle employed can be varied over rather wide limits with relation to the monomer and catalyst mixture. Best results are obtained using a concentration of catalyst of from about 0.1% to about 2% by weight based on the weight of the vehicle. The concentration of the monomer in the vehicle will vary rather widely depending upon the reaction conditions and will usually range from about 2 to 50% by weight. For a solution process it is preferred to use a concentration from about 2 to about 10% by weight based on the weight of the vehicle and for a slurry type of process higher concentrations, for example, up to 40% and higher are preferred. Higher concentrations of monomer ordinarily increase the rate of polymerization, but concentrations of 5 to 10% by weight in a solution process are ordinarily less desirable because the polymer dissolved in the reaction medium results in a very viscous solution.

The organic vehicle employed in the polymerization reaction can be an aliphatic alkane or cycloalkane such as pentane, hexane, heptane, or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene, xylene or the like, or a halogenated aromatic compound such as chlorobenzene, chloronaphthalene, or orthodichlorobenzene. The nature of the vehicle is subject to considerable variation, although the vehicle employed should be liquid under the conditions of reaction and relatively inert. The hydrocarbon liquids are desirably employed. Other solvents which can be used include ethyl benzene, isopropyl benzene, ethyl toluene, n-propyl benzene, diethyl benzenes, mono and dialkyl naphthalenes, n-octane, isooctane, methyl cyclohexane, tetralin, decalin, and any of the other well known inert liquid hydrocarbons.

The polymerization ordinarily is accomplished by merely admixing the components of the polymerization mixture, and no additional heat is necessary unless it is desired to effect the polymerization at an elevated temperature in order to increase the solubility of polymeric product in the vehicle. When the highly uniform polymers are desired employing the continuous process wherein the relative proportions of the various components are maintained substantially constant, the temperature is desirably controlled within a relatively narrow range. This is readily accomplished since the solvent vehicle forms a high percentage of the polymerization mixture and hence can be heated or cooled to maintain the temperature as desired.

The polymerization reaction has been described above as being effective primarily for the polymerization of $\alpha$-monoolefins. This process can also be used for polymerizing other $\alpha$-monoolefins, and it is not necessary to limit the process of the invention to monoolefins. Other $\alpha$-olefins that can be used are butadiene, isoprene, 1,3-pentadiene and the like.

The following examples are illustrative of the results obtainable by practicing our invention.

*Example 1*

In an argon-filled 1-liter creased flask equipped with a high-speed stirrer, solids addition funnel, and condenser were placed 400 ml. of a eutectic mixture of diphenyl ether and biphenyl and 58 grams of titanium tetrachloride. The mixture was heated to 50° C. and, with the stirrer operating at high speed, finely divided (180–200 mesh) lithium-aluminum alloy ($Li_3Al$) was added slowly from the argon-filled solids addition funnel. The temperature was controlled at 50–60° C. by the addition rate. A total of 2.6 g. of $Li_3Al$ was added. After 1 hour at 50° C., the temperature was raised to 170° C. for 1 hour. The contents of the flask were cooled, filtered and washed with petroleum ether in an argon-filled drybox. The petroleum ether was removed by vacuum on a steam bath. The yield of titanium trichloride was 47.7 grams (Theory=50 g.).

In the dry box, a clean, dry, stainless steel autoclave was charged with 0.33 gram of triethylaluminum, and 0.22 g. of the titanium trichloride prepared above. The autoclave was removed from the dry box and 200 ml. of propylene was injected. The temperature was raised to 85° C., and the autoclave was rocked for one hour. The run was killed with ethanol, and the polymer was isolated. The weight of dry polymer was 48 grams. Thus, the rate of polymerization was 96 grams per gram of catalyst per hour. The crystallinity of this polymer was 96%. The above catalyst, when used in the same manner to polymerize 1-butene, 3-methyl-1-butene, styrene, 4-methyl-1-pentene, allylcyclohexane and the like, produce highly crystalline polyolefins.

*Example 2*

The use of $VCl_4$, $ZrCl_4$, $MoCl_5$, $WCl_6$ or $CrCl_3$ in place of $TiCl_4$ in the procedure of Example 1 also provides a highly active polyolefin catalyst component. Also, mixtures of $TiCl_4$ with one or more halides of vanadium, zirconium, molybdenum, tungsten and chomium give effective catalyst components when prepared according to the procedure of Example 1.

*Example 3*

The equipment and procedure of Example 1 were used, except that 10.5 grams of a sodium-potassium eutectic, containing 74.14% potassium and 25.86% sodium, was used instead of the lithium-aluminum, and the solvent was 400 ml. of a 25% solution of hexamethylphosphoric triamide in toluene. The titanium tetrachloride solution was cooled to 0° C. and the alkali metal eutectic (M.P. —9° C.) was added slowly to keep the temperature at 0° to 5° C. The titanium trichloride obtained from this reaction (48.3 grams) gave, under the polymerization conditions of Example 1, a rate of 104 grams of polymer per gram of catalyst per hour. The crystallinity of this product was 96%. The solution of hexamethylphosphoric triamide can be replaced by solutions of 15% triphenylphosphine oxide in cyclohexanone and in benzonitrile.

*Example 4*

The equipment and procedure of Example 1 were used, but the reducing agent was 7.5 grams of sodium sand dispersed in 20 ml. of toluene. The reduction temperature was 85° C. In the polymerization test with the titanium trichloride thus produced, a polymerization rate of 101 grams per gram of catalyst per hour was obtained, and the polymer was 97% crystalline.

*Example 5*

The procedure of Example 1 was followed, but the product of the reduction reaction was not filtered. A rate of 102 grams per gram per hour was obtained, when an aliquot was taken equivalent to 0.22 g. of $TiCl_3$ and used in the polymerization catalyst as in Example 1. The crystallinity of this polymer was 94%.

*Example 6*

The procedure of Example 1 was followed, but the reduction reaction mixture was filtered at 75° C. and washed with toluene. The polymerization rate was 100 grams per gram of catalyst per hour, and the crystallinity was 98%.

The use of reduced transition metal halides produced in accordance with our invention in olefin polymerization catalysts results in a highly unexpected increase in the rate of polymerization when compared with prior art types of reduced transition metal halides. Also, the use of our reduced transition metal halides in olefin polymerization reactions results in the production of a polymer having an unexpectedly increased crystallinity and an unexpectedly decreased amorphous polymer content. From the results obtained with prior art and commercial types of reduced transition metal halides, the results we have realized could not have been foreseen.

A co-reducing agent can be used with the Group I reducing metal in practicing our invention. The co-reducing agents that can be employed in the practice of our invention to assist in the production of a reduced transition metal halide are compounds of metals in Groups I$a$, II and III$a$ of the Periodic Table. These compounds can be the alkyl, phenyl or hydride derivatives of the metals in Groups I$a$, II and III$a$ or the complex hydride, alkyl or phenyl derivatives of aluminum and an alkali metal. Also organoaluminum halides, having the formula $R_mAlX_n$ and $R_3Al_2X_3$ wherein R is a hydrocarbon radical selected from the group consisting of lower alkyl, cycloalkyl, phenyl and tolyl, and X is a halogen selected from the group consisting of chlorine and bromine, and $m$ and $n$ are integers whose sum is equivalent to the valence of aluminum, can be used as co-reducing agents. Similarly, organomagnesium compounds, having the formula RMgX wherein R and X are as defined above for the organoaluminum compounds, are useful in the practice of our invention. Typical co-reducing agents that can be used are the trialkyl and triphenyl aluminum compounds, trialkyl boron, lithium aluminum hydride and lithium aluminum tetraalkyl; dialkyl aluminum chloride, alkyl aluminum dichloride, alkyl aluminum sesquichloride, dialkyl aluminum hydride, sodium hydride, potassium hydride, lithium hydride, alkyl lithium, phenyl lithium, dialkyl zinc, alkyl magnesium chloride, sodium alkyl and the like. In the co-reducing agents set forth above the alkyl radicals can contain from 1 to 12 carbon atoms.

The amount of co-reducing agent that is used in the practice of our invention can be varied widely but the most useful range is from about 0.1 mole percent to 10 mole percent based on the stoichiometric number of moles of reducing metal that is employed. If desired, however, the amount of co-reducing agent can be as high as 25 mole percent and 50 mole percent can be used if desired. The co-reducing agents can be used to decrease the amount of reducing metal that is employed to reduce the transition metal halide, and in some instances, it may be useful to use the co-reducing agent in addition to the usual amount of reducing metal and thus to increase the total amount of reducing agent employed in the reaction. It is important, however, to carry out the reduction with the reducing metal and co-reducing agent in situ. This is accomplished as a practical matter by adding a slurry containing the reducing metal in powder form and the co-reducing agent to a solution of the transition metal halide that is to be reduced. The reverse addition of reactants can be used, but more reproducible results are obtained by adding the mixture of reducing agents to the transition metal halide.

Although the invention has been described in detail with reference to certain preferred embodiments thereof, variations and modifications can be effected within the spirit and scope of the invention as described hereinabove and as defined in the appended claims.

We claim:

1. A method for producing a reduced transition metal halide which comprises reacting a transition metal halide with a metal from Group I of the Periodic Table to form a halide of said metal from Group I of the Periodic Table in the absence of polymerizable compound and in the presence of a complexing agent that forms a complex with said halide of said metal from Group I of the Periodic Table, said complex being substantially soluble in said complexing agent, said reduced transition metal halide being substantially insoluble in said complexing agent, and recovering reduced transition metal halide from resulting reaction mixture.

2. The method for producing a reduced titanium halide which comprises reacting a titanium tetrahalide with an alkali metal selected from the group consisting of sodium, potassium and lithium to form a halide of said alkali metal in the absence of polymerizable compound and in the presence of a complexing agent that forms a complex with said halide of said alkali metal, said complex being substantially soluble in said complexing agent and said reduced titanium halide being substantially insoluble in said complexing agent, and separating reduced titanium halide from complexing agent containing dissolved complex.

3. The method for producing a reduced titanium halide which comprises reacting a titanium tetrahalide with an alkali metal selected from the group consisting of sodium, potassium and lithium to form a halide of said alkali metal in the absence of polymerizable compound and in the presence of diphenyl ether and separating reduced titanium halide from diphenyl ether containing dissolved complex of diphenyl ether and alkali metal halide.

4. The method for producing a reduced titanium halide which comprises reacting a titanium tetrahalide with an alkali metal selected from the group consisting of sodium, potassium and lithium to form a halide of said alkali metal in the absence of polymerizable compound and in the presence of hexamethyl phosphoric triamide and separating reduced titanium halide from hexamethyl phosphoric triamide containing dissolved complex of hexamethyl phosphoric triamide and alkali metal halide.

5. The method for producing titanium trichloride which comprises reacting titanium tetrachloride with lithium at a temperature within the range of −80 to 270° C. to form lithium chloride in the presence of diphenyl ether and in the absence of polymerizable compound, and separating titanium trichloride from diphenyl ether containing dissolved complex of diphenyl ether and lithium chloride.

6. The method for producing titanium trichloride which comprises reacting titanium tetrachloride with sodium at a temperature within the range of −80 to 270° C. to form sodium chloride in the presence of hexamethyl phosphoric triamide and in the absence of polymerizable compound and separating titanium trichloride from hexamethyl phosphoric triamide containing dissolved complex of hexamethyl phosphoric triamide and sodium chloride.

7. The method for producing vanadium trichloride which comprises reacting vanadium tetrachloride with lithium at a temperature within the range of −80 to 270° C. to form lithium chloride in the presence of diphenyl ether and in the absence of polymerizable compound and separating vanadium trichloride from diphenyl ether containing dissolved complex of diphenyl ether and lithium chloride.

8. The method for producing a mixture of reduced transition metal chlorides which comprises reacting a mixture of titanium tetrachloride and vanadium tetrachloride with sodium at a temperature within the range of −80 to 270° C. to form sodium chloride in the presence of diphenyl ether and in the absence of polymerizable compound, and separating a mixture of titanium trichloride and vanadium trichloride from diphenyl ether containing dissolved complex of diphenyl ether and sodium chloride.

9. In a catalytic process for the polymerization of α-olefinic hydrocarbon containing up to 10 carbon atoms to form solid, crystalline polymer wherein a reduced transition metal halide is employed as a component of the catalyst, the improvement which comprises employing in said catalyst a reduced transition metal halide prepared by reacting a transition metal halide with a metal from Group I of the Periodic Table to form a halide of said metal from Group I of the Periodic Table in the absence of polymerizable compound and in the presence of a complexing agent that forms a complex with said halide of said metal from Group I of the Periodic Table, said complex being substantially soluble in said complexing agent and said reduced transition metal halide being substantially insoluble in said complexing agent, and separating reduced transition metal halide from complexing agent containing dissolved complex.

10. In a catalytic process for the polymerization of propylene to form solid, crystalline polymer wherein titanium trichloride is employed as a component of the catalyst, the improvement which comprises employing titanium trichloride prepared by reacting titanium tetrachloride with lithium at a temperature within the range of −80 to 270° C. in the presence of diphenyl ether and separating titanium trichloride from diphenyl ether containing dissolved complex of diphenyl ether and lithium chloride.

11. In a catalytic process for the polymerization of propylene to form solid, crystalline polymer wherein titanium trichloride is employed as a component of the catalyst, the improvement which comprises employing titanium trichloride prepared by reacting titanium tetrachloride with sodium at a temperature within the range of −80 to 270° C. in the presence of hexamethyl phosphoric triamide and separating titanium trichloride from hexamethyl phosphoric triamide containing dissolved complex of hexamethyl phosphoric triamide and sodium chloride.

12. The method for producing a reduced transition metal halide which comprises reacting a transition metal halide with a reducing metal from Group I of the Periodic Table and a co-reducing compound of a metal from Groups Ia, II and IIIa of the Periodic Table to form a halide of said reducing metal from Group I of the Periodic Table in the absence of polymerizable compound and in the presence of a complexing agent that forms a complex with said halide of said reducing metal from Group I of the Periodic Table, said complex being substantially soluble in said complexing agent and said reduced transition metal halide being substantially insoluble in said complexing agent, and recovering reduced transition metal halide from resulting reaction mixture.

13. The method for producing titanium trichloride which comprises reacting titanium tetrachloride with lithium and a trialkyl aluminum in the absence of polymerizable compound and in the presence of diphenyl ether and separating titanium trichloride from diphenyl ether containing dissolved complex of diphenyl ether and lithium chloride.

14. The method for producing titanium trichloride which comprises reacting titanium tetrachloride with sodium and a trialkyl aluminum in the absence of polymerizable compound and in the presence of hexamethyl phosphoric triamide and separating titanium trichloride from hexamethyl phosphoric triamide containing dissolved complex of hexamethyl phosphoric triamide and sodium chloride.

No references cited.

JOSEPH L. SCHOFER, *Primary Examiner.*

L. EDELMAN, *Assistant Examiner.*